Dec. 5, 1950          J. E. RICHTER          2,532,785
HYDRAULIC ACTUATED STEERING FOR MOTOR-POWERED VEHICLES
Filed Sept. 20, 1949          2 Sheets-Sheet 1
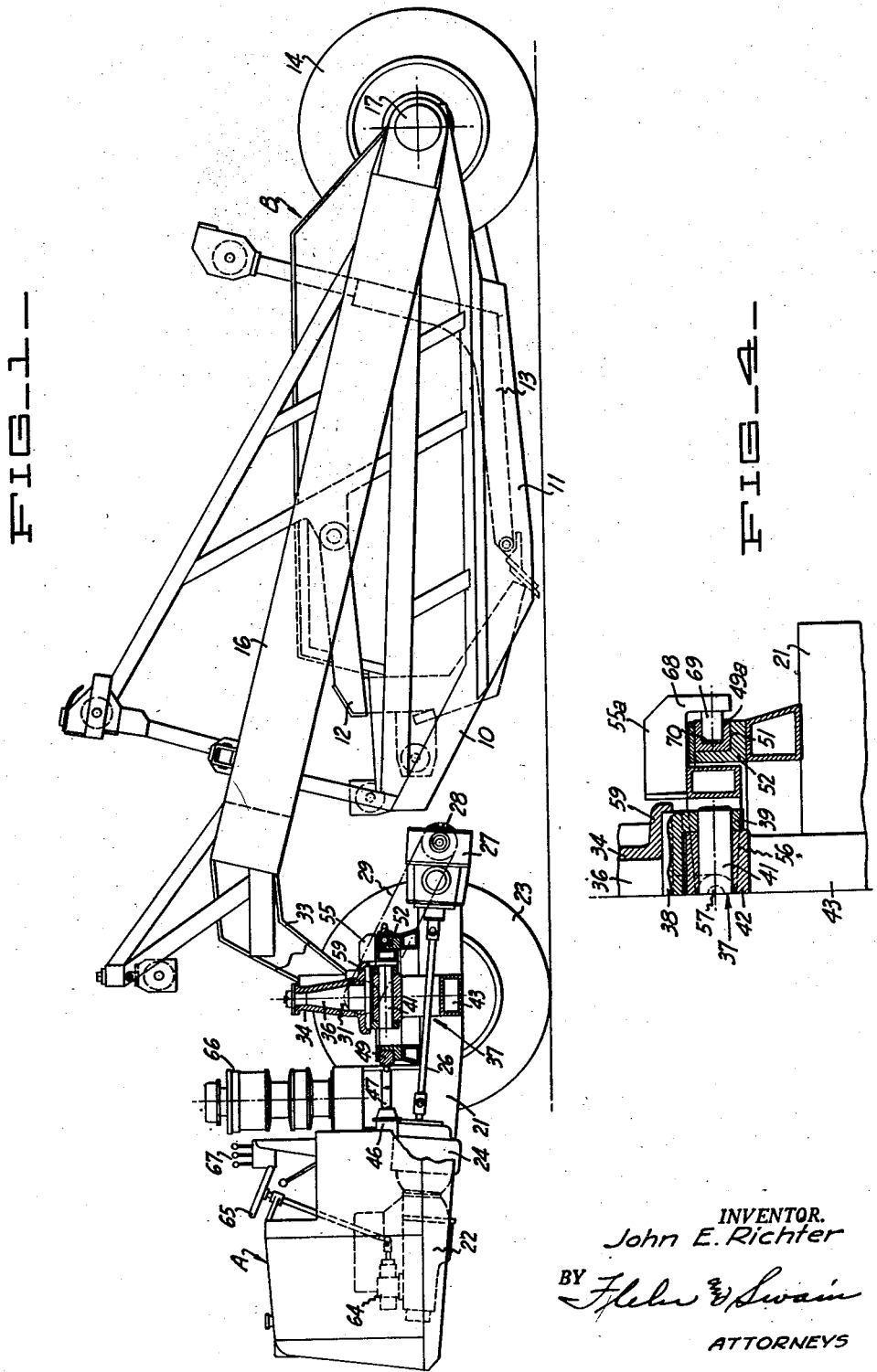
INVENTOR.
John E. Richter
BY
ATTORNEYS

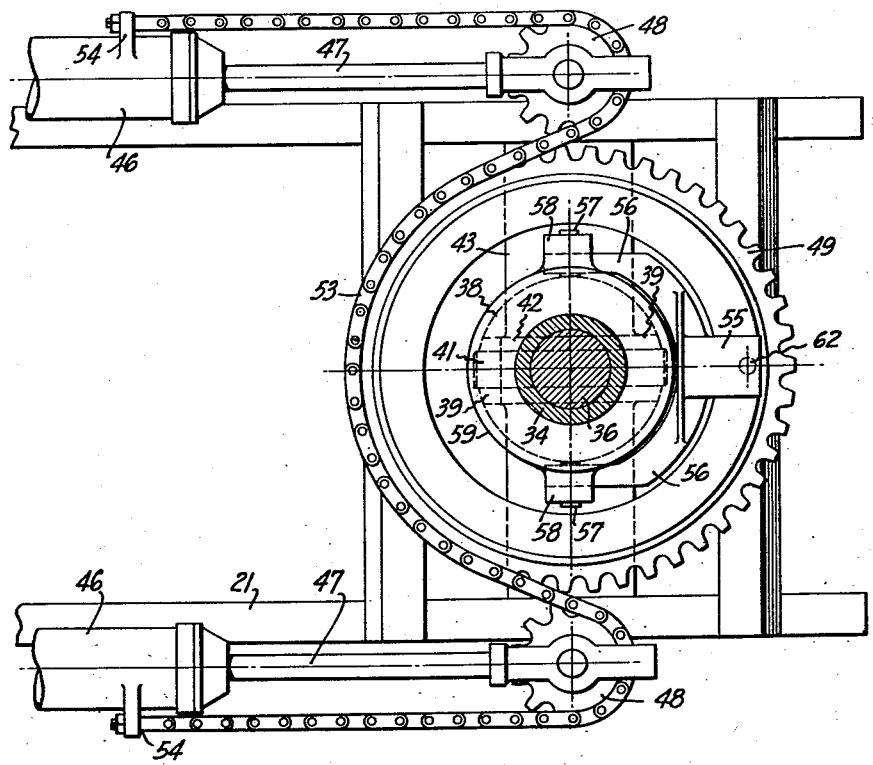
FIG_2_
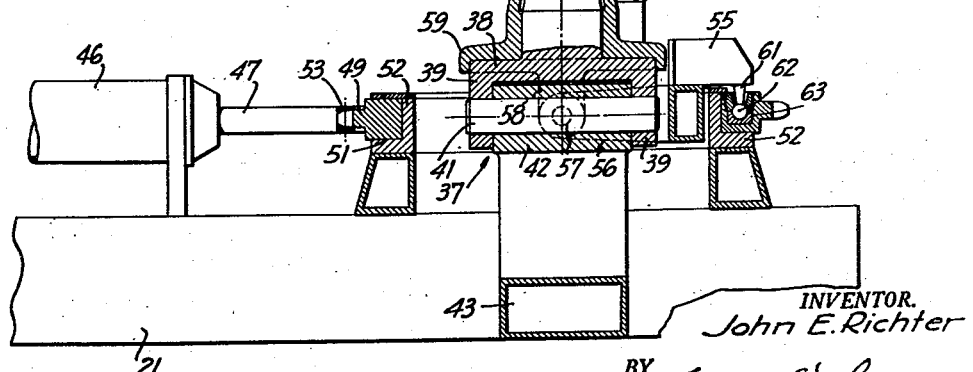
FIG_3_
INVENTOR.
John E. Richter
BY
ATTORNEYS

Patented Dec. 5, 1950

2,532,785

UNITED STATES PATENT OFFICE 2,532,785

HYDRAULIC ACTUATED STEERING FOR MOTOR-POWERED VEHICLES

John E. Richter, San Jose, Calif., assignor to Wooldridge Manufacturing Company, Sunnyvale, Calif., a corporation of Nevada Application September 20, 1949, Serial No. 116,723

6 Claims. (Cl. 180—79.2)

This invention relates generally to motor-powered vehicles of the heavy duty type adapted for the handling of relatively heavy loads.

It is a general object of the invention to provide improved steering apparatus for machines of the above character, and particularly an improvement to the type of steering apparatus disclosed and claimed in Clark Patent 2,368,202.

Another object of the invention is to provide improved vehicle steering apparatus which will enable turning of the tractor unit through a total angle of 180° or more relative to the trailer frame.

A further object of the invention is to provide an improved vehicle steering apparatus which facilitates manufacture, and which in particular makes possible the use of a less expensive chain than that required by the structure disclosed in Clark 2,368,202.

Additional objects of the invention will appear from the following description in which the preferred embodiment has been set forth in detail in conjunction with the accompanying drawing.

Referring to the drawing—

Figure 1 is a side elevational view of a scraper or earth mover incorporating the present invention.

Figure 2 is a plan view in detail of the steering mechanism.

Figure 3 is a cross-sectional side view along the line 3—3 of Figure 2.

Figure 4 is a cross-sectional side view of another embodiment of the invention.

As illustrated in the drawing the complete vehicle may consist of a tractor unit A, together with a trailer unit B. The trailer unit in this instance is in the form of a carrier scraper adapted to dig, carry and discharge earth. As illustrated it includes the main frame 10, the digging and carrying main bowl 11, the movable front apron 12 for the main bowl, and a hinged bottom wall 13 or expeller. The rear end of this structure carries the ground engaging wheels 14, and the forward end of the scraper is coupled to the tractor unit A by the use of means which will be presently described.

The main frame of the trailer is in the form of a yoke having side arms 16 extending along the sides of the main bowl and pivotally attached to the same at 17. Suitable operating cables are connected to the forward end of the main bowl 11, to the expeller 13 and to the front apron 12, as described in Patent 2,310,190 in order to operate these parts during operation of the machine.

The tractor unit A can be similar to that illustrated in Clark 2,368,202. Briefly it includes a rigid frame 21 which carries the driving motor 22. The motor is operatively connected to the wheels 23 through suitable means such as the driving gears an clutch 24, the rearwardly extending drive shaft 26 and the differential 27. The differential drives sprockets 28 which are connected by driving chains 29 with the sprockets 31. The latter sprockets are suitably journaled to the frame and serve to rotate pinions which in turn drive ring gears carried by the wheels 23. The wheels are mounted upon stud shafts which are aligned on an axis extending laterally of the frame.

The main frame of the trailer unit has a forward extension 33 by means of which the trailer is coupled to the tractor. This extension 33 is provided with a hub 34 which serves to journal the upright kingpin 36. A cradle connection 37 serves to attach the lower end of the kingpin to the frame of the tractor unit, whereby the tractor can oscillate about a horizontal axis. Thus the lower end of kingpin 36 is secured to the plate 38, and the forward and rear ends of this plate carry depending ears 39 which form a mounting for the horizontal pivot pin 41. Between the ears 39 the pin 41 is journaled in a bolster 42 carried by the rigid crossbeam 43 of the tractor frame. With this connection between the kingpin and the frame, the tractor unit is free to oscillate about the general horizontal axis of pin 41, while at the same time the kingpin may turn to permit steering movement of the tractor.

To apply steering forces between the tractor and the frame of the trailer, I provide a pair of hydraulic rams 46, the cylinders of which are rigidly mounted upon the frame of the tractor. The piston rods 47 extending from the hydraulic rams 46, are each provided with a sprocket 48.

Rotatably mounted upon the tractor frame 21 and concentric with the kingpin axis, there is a ring sprocket 49. This sprocket is operatively retained within an annular recess 51, formed by the journal mounting 52. The medial plane of this sprocket is coincident with the axis of pin 41, and the sprocket is normally horizontal. A portion of an operating chain 53 is engaged with the teeth of sprocket 49 for a segment of the same, and this chain also extends over the two sprockets 48. The ends of the chain extend forwardly and are anchored to the frame at 54. It will be evident that with this arrangement movement of the pistons 47 in opposite directions causes movement of that portion of the chain which extends between the sprockets 48, and this in turn causes rotation of the tractor relative to the sprocket 49, in one direction or the other.

The means employed for operatively connecting the sprocket 49 with the frame of the trailer, includes a steering arm 55. One end of this arm is forked to provide the branches 56, which are pivotally attached at 57 to the ears 58. The ears 58 are formed integral with a flange 59, formed on the lower end of the hub 34. The axis of the pivotal connections 57 is lateral of the machine, and it intersects the axis of the kingpin 36 and is at right angles thereto. Likewise this axis intersects the axis of the pin 41, and is normally in the same plane as the mean plane of the ring sprocket 49.

The free end of the arm 55 is suitably attached to one portion of the ring sprocket 49. Thus a stud 61 is shown mounted upon the free end of the arm, and carries a ball 62, which is accommodated in a socket 63 formed in the body of the ring gear. By means of this arrangement some pivotal movement is permitted between the arm and the ring sprocket, and the effective center of the ball 62 coincides generally with the medial plane of the sprocket.

The hydraulic system used in conjunction with the hydraulic rams 46, can be substantially the same as described in said Patent 2,368,202. This system can include the hydraulic control valve 64, operated by the steering member or wheel 65. The system also includes a suitable hydraulic pump driven by the motor of the tractor, and piping to deliver liquid under pressure to either one of the two rams. When liquid under pressure is being delivered to one ram, to move its piston rod 47 outwardly or toward the rear of the tractor, the liquid is being discharged from the other ram to permit its piston rod to be retracted.

The tractor can also be provided with a suitable multidrum winch unit 66. The drums of this unit can be selectively operated by the pneumatic control valve 67. Cables extend from the winch drums for operating the various parts of the trailer.

Operation of my machine can now be described as follows: For straight ahead steering position the two piston rods 47 will be projected equal distances, and the other parts will occupy positions substantially as illustrated in Figure 2. Under such conditions the tractor unit is free to oscillate about the horizontal axis of pin 41, without tendency to swing the tractor unit in one direction or the other relative to the frame of the trailer. When hydraulic liquid is supplied to one or the other of the hydraulic rams 46, one sprocket 48 is forced toward the rear of the tractor, while the other sprocket moves forwardly an equal amount. Such movement causes the chain 53 to turn the ring sprocket 49 relative to the tractor frame, and this in turn causes the entire tractor frame to swing relative to the frame of the trailer. Assuming that the machine is moving forward with a substantial steering angle, the tractor unit is free to oscillate about the axis of the pin 41 the same as for straight ahead position, and such movements are accommodated by the vertical floating action of the steering arm 55, without affecting the steering angle.

It will be evident that the apparatus described above makes possible steering through a relatively wide total angle. Thus it is possible to steer through a total angle of 180° or more, the only limitation upon the steering angle being the length of travel of the piston rods 47. As distinguished from the arrangement disclosed in Clark 2,368,202, the present improvement permits the use of a relatively inexpensive chain of the roller type, whereas the structure of the Clark patent requires more expensive types of chains. The chain is not subjected to severe wear because of the relatively large total area of contact with the teeth of the ring sprocket, and because the forces between the chain and the ring sprocket are distributed over a relatively large number of teeth.

Another embodiment of the invention is illustrated in Figure 4. In this instance the steering arm 55a corresponding to the steering arm 55, is provided with a depending portion 68, which carries a stud 69. The axis of this stud is coincident with the axis of pin 41. The teeth of the ring sprocket 49 are broken away at this point in order to amply accommodate the portion 68. The ring gear is provided with a socket 70 to accommodate the stud 69, and the axis of the socket is in the medial plane of the ring gear.

The embodiment of Figure 4 operates substantially the same as the first described embodiment. The ring sprocket is free to oscillate together with oscillations of the tractor unit, for any steering position. This arrangement likewise permits 180° or more total steering angle. This is because for extreme steering positions the sprocket 48 which is in closest proximity with the steering arm 55a, is retracted relative to its hydraulic ram, thus avoiding interference with the portion 68 of the steering arm.

I claim:

1. In a vehicle of the character described, a motor-powered tractor unit including a main frame, a trailer unit having a forward frame extension, an upright kingpin journaled to said extension, a pivotal connection between the lower end of the kingpin and the frame of the tractor for oscillating movement of the tractor about a horizontal axis extending longitudinally of the tractor, a ring-like member rotatably mounted upon the tractor and concentric with the kingpin axis, a steering arm pivotally attached to the frame extension for vertical movements about a transverse horizontal axis intersecting and at right angles to the kingpin axis, means forming a pivotal connection between the free end of the steering arm and said ring-like member, and means for applying steering forces between said member and the frame of the tractor.

2. In a vehicle of the character described, a motor-powered tractor unit having a main frame, a trailer unit having a forward frame extension, an upright kingpin journaled to said extension, a connection between the lower end of the kingpin and the frame of the tractor for oscillating movement of the tractor about a horizontal axis extending longitudinally of the tractor, a ring-like member rotatably mounted on the frame of the tractor and concentric with the kingpin axis, a steering arm pivotally attached to the frame extension for vertical movements about a horizontal transverse axis which intersects and is at right angles to the kingpin axis, means forming a pivotal connection between the free end of the steering arm and said ring-like member, the medial frame of said ring-like member being coincident with the axis of the pivotal connection between the kingpin and the frame of the tractor, a pivotal connection between the free end of the steering arm and said ring-like member being likewise disposed in said plane, and means mounted upon the frame of the tractor for applying steering forces between said ring-like member and the frame of the tractor.

3. In a vehicle of the character described, a motor-powered tractor unit having a main frame, a trailer unit having a forward frame extension, an upright kingpin journaled to said extension, a pivotal connection between the lower end of the kingpin and the frame of the tractor for oscillating movement of the tractor about a horizontal axis extending longitudinally of the tractor, a ring-like sprocket rotatably mounted upon the tractor frame and concentric with the kingpin axis, a steering arm pivotally attached to the frame extension for vertical movements about a horizontal axis extending laterally of the trailer frame and intersecting and at right angles to the kingpin axis, means forming a pivotal connection between the free end of the steering arm and said ring-like sprocket, a sprocket chain engaging a segmental portion of said ring-like sprocket, and means mounted upon the frame of the tractor for applying forces to the chain to effect rotation of said ring-like sprocket relative to the frame of the tractor.

4. In a vehicle of the character described, a motor-powered tractor unit having a main frame, a trailer unit having a forward frame extension, an upright kingpin journaled to said extension, a connection between the lower end of the kingpin and the frame of the tractor for oscillating movement of the tractor about a horizontal axis extending longitudinally of the tractor frame, a ring-like sprocket rotatably mounted upon the tractor frame concentric with the kingpin axis, a steering arm pivotally attached to the frame extension for vertical movement about a horizontal axis extending laterally of the trailer and intersecting and at right angles to the kingpin axis, said last named axis being substantially in the same plane as the axis of said pivotal connection between the kingpin and the tractor frame, means forming a pivotal connection between the free end of the steering arm and said ring-like sprocket, said pivotal connection being substantially in said plane, a sprocket chain engaging a segmental portion of the ring-like sprocket, and means mounted upon the tractor frame for actuating said sprocket chain to turn the ring-like sprocket relative to the tractor frame.

5. A vehicle as in claim 4 in which said last named means comprises a pair of hydraulic rams mounted upon the tractor frame, said rams being operatively connected to said sprocket chain.

6. A vehicle construction as in claim 4 in which the steering arm extends rearwardly in the vertical longitudinal plane of the trailer and in which the sprocket chain engages a forward segmental portion of the ring-like sprocket.

JOHN E. RICHTER.

REFERENCES CITED

The following references are of record in the file of this patent:

UNITED STATES PATENTS

| Number | Name | Date |
| --- | --- | --- |
| 2,362,262 | French | Nov. 7, 1944 |
| 2,368,202 | Clark | Jan. 30, 1945 |